(12) United States Patent
Tada

(10) Patent No.: US 6,212,167 B1
(45) Date of Patent: Apr. 3, 2001

(54) MULTIPLEXING TRANSMITTER

(75) Inventor: Katsuyuki Tada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/940,292

(22) Filed: Sep. 30, 1997

(30) Foreign Application Priority Data

Feb. 26, 1997 (JP) ................................... 9-042022

(51) Int. Cl.$^7$ ................................ H04J 3/04; H04J 1/16
(52) U.S. Cl. ............................................ 370/242; 370/535
(58) Field of Search ................................ 370/216, 217, 370/221, 222, 223, 224, 225, 403, 468, 535, 907, 242, 243, 248, 249, 258

(56) References Cited

U.S. PATENT DOCUMENTS

| | | | |
|---|---|---|---|
| 5,179,548 | * | 1/1993 | Sandesara ............................ 370/222 |
| 5,333,130 | * | 7/1994 | Weissmann et al. ................ 370/221 |
| 5,412,652 | * | 5/1995 | Lu ........................................ 370/468 |
| 5,416,768 | * | 5/1995 | Jahromi ................................ 370/403 |

* cited by examiner

*Primary Examiner*—Chau Nguyen
*Assistant Examiner*—Chiho Andrew Lee
(74) *Attorney, Agent, or Firm*—Helfgott & Karas, P.C.

(57) ABSTRACT

An optical multiplexing transmitter having functions for dropping or demultiplexing an optional time slot of a channel of a high-ordered group to optional channels of a low-ordered group channels and adding and multiplexing optional time slots of a low-ordered group to a channel of the high-ordered group in the reversed direction also referred as to an add/drop cross connect function. The optical multiplexing transmitter further, for may loopback optional time slots of the low-ordered group to optional channels of the low-ordered group also referred to as a hair pin cross connecting function.

12 Claims, 11 Drawing Sheets

MULTIPLEXING TRANSMITTER

BACKGROUND OF THE INVENTION

1. Field of the Invention

The present invention relates to a multiplexing transmitter having a cross connecting function. More particularly, it relates to a multiplexing transmitter having functions for dropping or demultiplexing an optional time slot of a channel of a high-ordered group to optional channels of a low-ordered group or adding and multiplexing optional time slots of a low-ordered group to a channel of the high-ordered group in the reversed direction (hereinafter it is referred as to an add/drop cross connect function), and further, for turning optional time slots of the low-ordered group to optional channels of the low-ordered group (hereinafter, it is referred to as a hair pin cross connecting function).

2. Description of the prior Art

While a multiplexing transmitter having a large-capacity transmitting function has been developed, it is required to realize higher channel protection with a cheap investment in recent years.

Therefore, there has been a strong demand for a system having a higher channel protection power which employs an optical multiplexing transmitter according to a channel protecting method operating in a ring configuration so called as a PATH-SW method, in which the number of optical fibers can be reduced to pare down costs of a system. In here, the channel protection power is defined as a ratio of channels by which a communication can be continued even when a failure occurs such as disconnection of a fiber transmission line.

According to the expansion of an add/drop cross connect function, demands for modifying a specific path channel or installing more specific path channels in networks originally constructed as different optical communication networks, respectively, after starting operation in order to cope with development of the communication markets in an appropriate area and efficient use of installed, residual optical fiber transmission paths.

For example, there is a case where more path channels are installed between transmission terminals respectively connected to each optical multiplexing transmitter including a cross connect function located on each node of two separate ring-formed networks, each of which is originally formed as an independent network.

In this case, a path channel of a high-ordered group should be maintained in bi-directions of upward and downward on West and East sides in each ring-formed network. Therefore, it is easy to maintain a path channel of the high-ordered group even if a failure occurs on a transmission path connecting to either West or East side in ring-formed network.

However, a transmission path connecting between two separate ring-formed networks is not formed as a ring, and has no redundancy. Because of that, if a failure occurs on the transmission path connecting between the two separate ring-formed networks, it becomes impossible to maintain a path channel between the two separate ring-formed networks.

As mentioned above, when more path channels bestriding over the two different ring-formed networks are installed, it is easy to protect the failed path channel even if a failure occurs on either upward or downward transmission path in each ring-formed network.

However, when a failure occurs on a transmission path bestriding over the two separate ring-formed networks, it is not easy to protect the failed channel. In this way, there are one case wherein it is easy to protect the failed channel, and the other case wherein it is not easy.

Therefore, it is required to give a protection even to a transmission failure on path channels in the above-described form. Simultaneously, it is also required to monitor a failure to distinguish whether the failure should be immediately protected or not in order to reduce a maintenance cost. Additionally, it is required to have a failure warning function with an information of a priority for protecting failed channels, and the priority is determined according to degree of influence on a service to end users.

SUMMARY OF THE INVENTION

Accordingly, it is an object of the present invention to provide an optical multiplexing transmitter including a cross connect function to realize more channel protection by constructing a preferred network.

It is another object of the present invention to provide an optical multiplexing transmitter possible to highly protect a failed path channel, that is, a service to end users, even if failures occur on one transmission path that has no redundancy connecting between the separate ring-formed networks.

It is another object of the present invention to provide an optical multiplexing transmitter, which is able to execute maintenance and operation services according to a priority of protecting a failed channel. The priority is determined according to the degree of influence on a service to end users.

It is a further object of the present invention to provide an optical multiplexing transmitter which can highly protect a failed channel by employing a hair pin cross connecting function even if a failure occurs on a transmission path, in which a redundancy for connecting between separate ring-formed networks is not formed.

DESCRIPTION OF THE PREFERRED EMBODIMENTS

Figure 1:
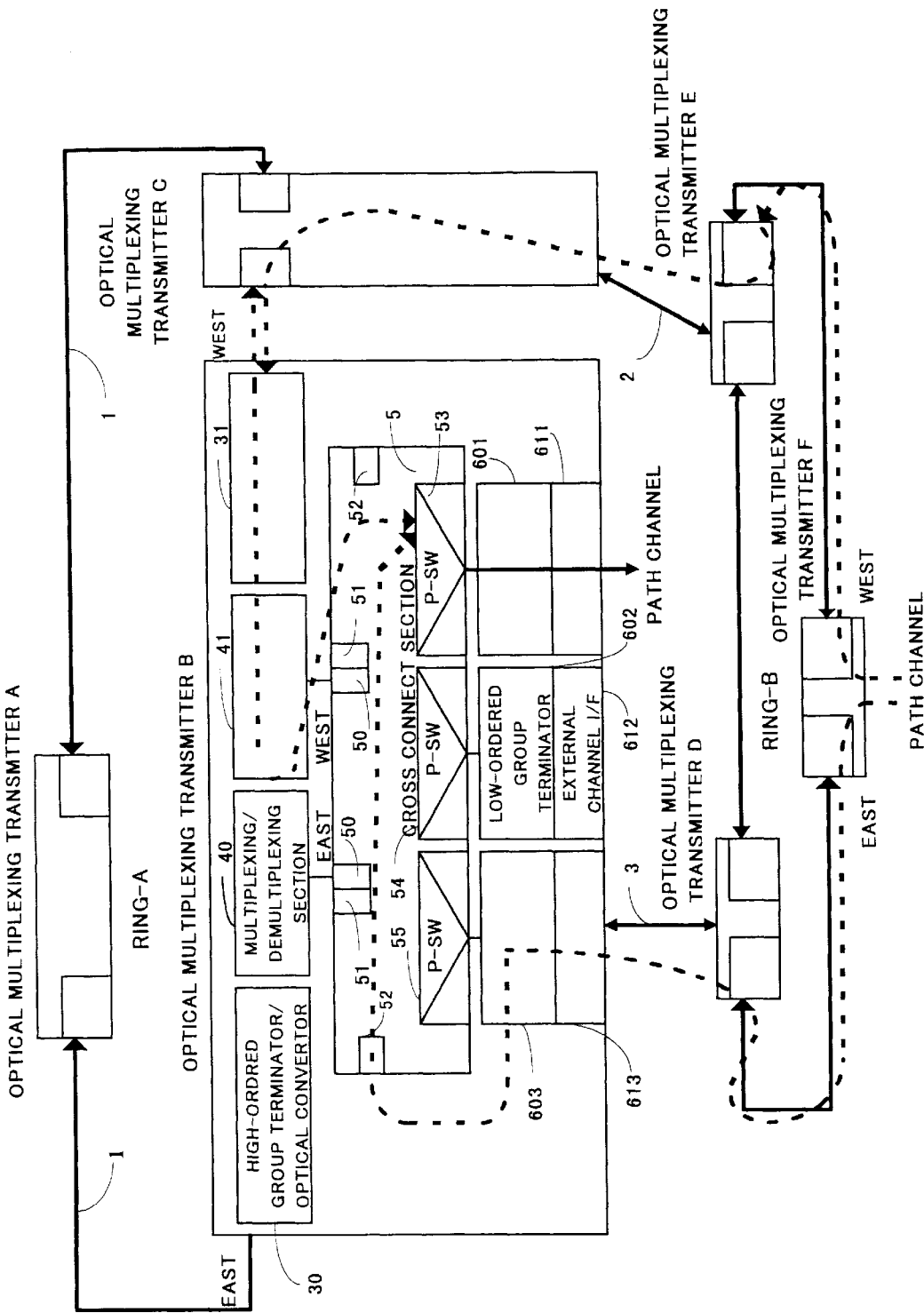
FIG. 1 shows a diagram illustrating an embodiment of a network including optical multiplexing transmitters according to the present invention in order to overcome shortages on the conventional structure.

Hereinafter, embodiments of the present invention will be explained in accompanying with the attached drawings. Throughout the following descriptions, the same reference numerals are used to denote and identify corresponding or identical components.

Before explaining the embodiments of the present invention, a detailed example of a conventional optical multiplexing transmitter will be explained for better understanding the present invention.

Figure 11:
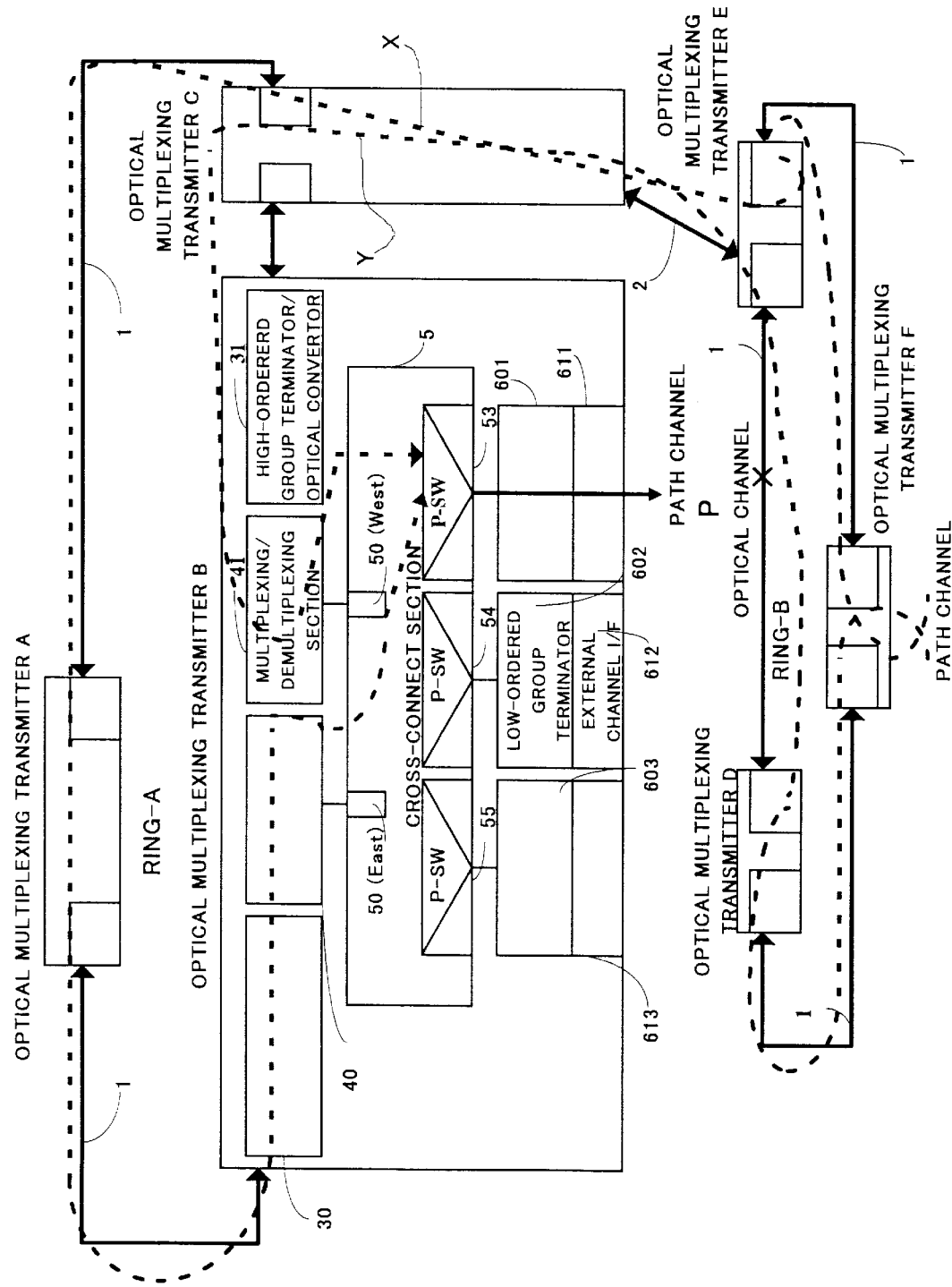
FIG. 11 is an explanatory diagram of a case of installing a path channel between ring-formed networks A and B formed for independent channel construction.

FIG. 11 shows a case where an additional path channel is installed between separate ring-formed networks A and B, each of which is formed as an independent channel network.

Each of optical multiplexing transmitters A, B, and C is connected to the first ring-formed network A as a node. Additionally, each of optical multiplexing transmitters D, E, and F is connected to the second ring-formed network B as each node. In this example, the optical multiplexing transmitter A connected to the first optical multiplexing transmitter A is provided on a telephone office, which is located several 10 km distance away from another telephone office where the second optical multiplexing transmitter F is located.

In FIG. 11, only a detailed structure of the optical multiplexing transmitter B is shown, but other optical multiplexing transmitters have the same structure.

Additionally, in FIG. 11, a transmission path 1 for transmitting multiplexed signals of a high-ordered group, shown with bi-directional arrows is formed by an optical fiber transmission line. The optical fiber transmission line 1 consists of a bi-directional working and protection pair.

In here, each of the optical multiplexing transmitters has a drop function for receiving the multiplexed signals of the high-ordered group transmitted through the transmission path 1, demultiplexing from the multiplexed signals, signals corresponding to channels of the low-ordered group, and connecting the demultiplexed signal to terminals connected to each optical multiplexing transmitter, and an add function for multiplexing and connecting signals of the low-ordered group from the terminals in reverse and transmitting them to the transmission path 1 as multiplexed signals of the high-ordered group.

In this example, optical multiplexing transmitters C and E are connected through an optical fiber transmission path 2. Therefore, it is possible to set a path of channels bestriding over the first ring-formed network A and the second ring-formed network B.

In FIG. 11, for example, a case of installing more path channels between the optical multiplexing transmitter B connected to the ring-formed network A and the optical multiplexing transmitter F connected to the ring-formed network B will be explained as follows.

Only one directional path channel directed from the optical multiplexing transmitter F connected to the ring-formed network B to the optical multiplexing transmitter B connected to the ring-formed network A will be explained here, but the other directional path channel in the reversed direction is the same as the one directional path channel.

The optical multiplexing transmitter F sends a signal to the East (a direction passing through the optical multiplexing transmitter D) and West (a direction passing through the optical multiplexing transmitter E) directions. Then, the signal is sent to an optical multiplexing transmitter C via an optical multiplexing transmitter E through an optical fiber transmission path 2.

In this way, the multiplexed signals sent to the East and West directions are commonly received to the optical multiplexing transmitter C connected to the ring-formed network A through an optical fiber transmission path 2. The signal received in the optical multiplexing transmitter C is transferred to the East and West directions in the ring-formed network A. Then, the signals from the East and the West directions are inputted to the optical multiplexing transmitter B.

As described above, a path channel multiplexed in the ring-formed network B is connected to the optical multiplexing transmitter C in the ring-formed network A through an optical multiplexing transmitter E. Additionally, the optical transmission path from the optical multiplexing transmitter C to the optical multiplexing transmitter B is duplicated as shown with bold broken arrows X and Y in the diagram. It means that a redundancy channel is maintained.

Even if a failure concurrently occurs on the optical fiber transmission path 1 connecting the optical multiplexing transmitters D and E in the ring-formed network B, and one optical fiber in the ring-formed network A, it is, therefore, possible to protect a path channel, i.e., a service to end users connected to the optical multiplexing transmitter B.

With the structure shown in FIG. 11, when a failure occurs on the fiber transmission path 2 between the optical multiplexing transmitters E and C bestriding over two independent networks, it is impossible to protect the path channel. Then, it is required to protect the path channel failure in this case.

However, it is seldom that a failure exerting influence on a service to end users, such as a failure occurs on the fiber transmission path 2 in an add/drop cross connect device having a redundancy structure in a plurality of portions as described above.

Considering to reduce the costs required for maintenance of failed paths, it should be judged whether or not the failed path be maintained immediately. Therefore, it is required to execute a failure warning with an information of a priority for processing the failed path channels according to the influencing degree for a service to the end users.

In here, a failure exerting influence on end users are defined as a SA, i.e., a service affect, and a fault protected by a redundancy is defined as a NSA, i.e. a non-service affect. Then, the following failure types will be considered.

In a first case, a path channel failure concurrently occurs with a nodal failure influencing to the path channel on an optical multiplexing transmitter.

In a second case, failures concurrently occur in the both of single receiving path channel and single transmitting path channel.

Additionally, as shown in FIG. 11, the path channel is laid through a plurality of optical fiber transmission lines 1. For example, when a failure P of a fiber transmission line occurs between the optical multiplexing transmitters D and E, only the optical fiber transmission line laid between the optical multiplexing transmitters D and E should be maintained.

Therefore, only a warning is given to a maintenance person to indicate a path channel passing through the optical multiplexing transmitter E is failed as a path channel failure of NSA on the optical multiplexing transmitter B. It is required for the optical multiplexing transmitter E to mask the failed channel in order to cope with problems of maintenance confusion caused by the path channel failure according to the path channel failure that occurs secondarily.

In a fourth case, it is required to protect the existing service from the miscross-connection, in an add/drop cross connect device in which more path channels can be freely installed without influencing the path channel during operation, as a request for supplying the degree of freedom.

In FIG. 1, a network including optical multiplexing transmitters according to the present invention is shown to solve the problems on the conventional structure. In the present embodiment, the add/drop cross connect equipment includes a failure warning function attached with information of a priority determined according to the degree of influence to the end users in order to cope with the above-described failure cases. However, the detailed contents will be explained later.

A network shown in FIG. 1 has the same structure as that shown in FIG. 11. In the network shown in FIG. 1, the network employs a function for connecting optional time slots of the low-ordered group are to optional channels of the low-ordered group (hereinafter, it is called as a hair pin cross connect) as a feature of the present invention.

Thereby, an optical multiplexing transmitter possible to protect a path channel, i.e., a service to end users, is provided in FIG. 1 even if a failure occurs a transmission path in which redundancy is not formed for connecting between the separate ring-formed networks, for example, on the transmission path 2 transmitting multiplexed signals of the high-ordered group connecting between the networks.

As a structure of an optical multiplexing transmitter realizing a hair pin cross connection is the same as that of the optical multiplexing transmitters A to F, only a structure of the optical multiplexing transmitter B will be explained similarly to the explanation of FIG. 11.

The optical multiplexing transmitter B includes high-ordered group terminators/optical converters 30 and 31 and multiplexers/demultiplexers 40 and 41 at signal input and output sections respectively on East and West sides. The transmitter B further includes a cross connect section 5.

The cross connect section 5 includes add table 50, drop table 51 and hair pin drop table 52 on both of the East and West sides. The section 5 further includes a plurality of path switches (P-SW) 53 to 55 for switching to output a signal having no channel failure flag selected from signals inputted from the East and West sides.

The optical multiplexing transmitter B includes low-ordered group terminators 601, 602, and 603 and external channel interface sections 611, 612, and 613 corresponding to the path switches (P-SW) 53 to 55.

The above-described high-ordered group terminators/optical converters 30 and 31 convert optical signals inputted from the optical fiber transmission line 1 which transmits multiplexed optical signals of the high-ordered group to digital electrical signals or converts the electrical signals to the optical signals, and send the converted signals to the optical fiber transmission line 1. Further, the high-ordered group terminators/optical converters 30 and 31 detect an optical channel failure of the high-ordered group on the process of the signal conversion.

Multiplexers/demultiplexers 40 and 41 multiplex and demultiplex signals of a path channel per a channel connection for cross connecting in the cross connect section 5.

The cross connect section 5 connects optional path channels of the high-ordered group and the low-ordered group predetermined according to time slots. The path switches 53 to 55 include duplicated switch functional sections for determining which one of the path channels inputted from the optical lines of East and West sides are connected to a channel of the low-ordered group. Further, the switch sections include a function for detecting each path channel failure and a path channel failure on the faced side called as a YEL alarm. Accordingly, the path switches 53 to 55 select signals on the transmission path 1 of the high-ordered group inputted from the East or West side having no failure, and output them.

The low-ordered group terminators 601 to 603 include a multiplexing/demultiplexing function for multiplexing signals on path channels inputted from the low-ordered group connected to the optical multiplexing transmitter, to signals on path channels per a cross connection.

The external channel interface sections 611 to 613 include a function for converting electrical levels suitable to various kinds of external channel interfaces and a function for detecting external channel failures. In FIG. 1, according to the present invention, the optical multiplexing fiber transmission line 3 directly connects the optical multiplexing transmitters B and D respectively on the separate ring-formed networks A and B.

The optical multiplexing fiber transmission line 3 connects the external channel interface sections 613 of the optical multiplexing transmitters B and D to form a hair pin cross connect for connecting an optional time slot of the low-order group to another optional channel of the low-ordered group.

Figure 2:
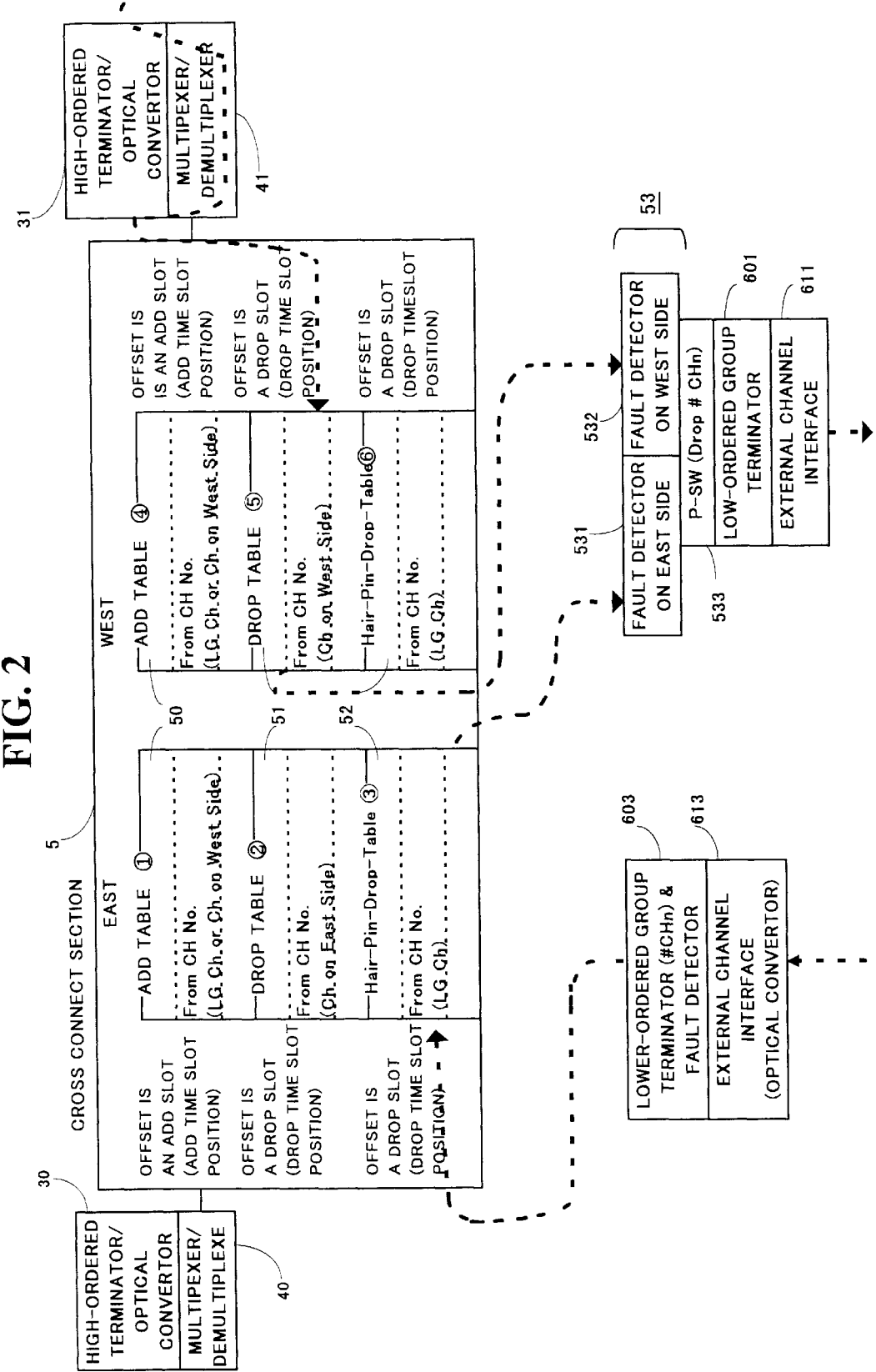
FIG. 2 is an explanatory diagram of a hair pin cross connect structure shown in FIG. 1.

A structure of the hair pin cross connection will be further explained in accompanying to FIG. 2. Functions of the high-ordered group terminators/optical converters 30 and 31 and the multiplexer/demultiplexer 40 and 41 on the optical multiplexing transmitter B are the same as explained in FIG. 1. Further, the low-ordered terminator/fault detecting section 603 and the external channel interface section/optical converter 613 are the same as explained in FIG. 1.

The cross connect section 5 includes an add table 50, a drop table 51 and a hair pin drop table 52 on each of East and West sides. These tables store the following definitions.

The add table 50 ① on the East side stores data for defining to which time slot channel CH of the high-ordered group, a time slot channel CH of the low-ordered group inputted from the low-order group terminator 603 is connected. That is, the position in the add table 50 ① corresponds to a channel of the high-ordered group CH, to which a time slot channel CH of the low-ordered group is to be added. In addition, the data stored in the position of the corresponding channel of the high-ordered group CH means the time slot channel CH of the low-ordered group to be added.

In this embodiment, the add table 50 ① has 28 columns. Therefore, combinations of the low-ordered group for the maximum 28 channels CH of the high-order group may be shown in the table for the 28 columns.

The add table 50 ④ on the West side has the same contents as those of the add table 50 ①.

The drop table 51 ⑤ on the East side defines which time slot channel CH of the high-order group inputted from the multiplexer/demultiplexer 40 is connected to which time slot channel CH of the low-ordered group. The position in the table 51 ② means the channel CH of the low-ordered group, to which a time slot channel CH of the high-ordered group is dropped. The data is stored on a position corresponding to the appropriate channel of the low-ordered group. Then, the stored data means the time slot channel CH of the high-order group to be dropped.

The drop table 51 ⑤ on the West side has the same contents as that of the drop table 51 ②. In the diagram, an example of dropping a channel from the West side to the channel CHm of the low-ordered group is shown as illustrated with a bold broken arrow, i.e., a channel from the multiplexer/demultiplexer 41 on the West side to the path switch 53.

The hair pin drop table 52 ③ defines which time slot channel CH from the low-ordered group terminator 603 is connected to which time slot channel CH of the low-ordered group connecting to the optical multiplexing transmitter including the hair pin drop table 52 ③. The position of the table 52 ③ means a time slot channel CH of the low-ordered group for hair pin dropping. The data written to the appropriate table position means the time slot channel CH of the low-ordered group turned by the hair pin drop.

That is, connections should be specified on two positions of the appropriate hair pin table when connecting in bi-direction with hair pin cross connection. In the diagram, the example for hair-pin dropping from the channel CHn to the channel CHm is shown as illustrated with a bold broken arrow, i.e., a channel sent from the low-ordered terminator 603 to the path switch 53.

The hair pin drop table 52 ⑥ has the same structure as that of the hair pin drop table 52 ③. In here, when the hair pin drop tables 52 ③ and ⑥ are combined with drop-cross connects, i.e., with the drop tables 51 ② and ⑤, the hair pin tables 52 ③ and 52 ⑥ are properly used depending on from which one of the East and West sides the drop cross connection is made. When the drop cross connection is not commonly used with the hair pin drop table 52 ③ and 52 ⑥, the East side is preferentially used to realize the hair pin cross connection.

In the present invention, it is possible to keep the path channel between the optical multiplexing transmitters F and C even if a failure occurs on the transmission line 2 between the optical multiplexing transmitters E and C in FIG. 1 by employing connection of the hair pin cross connect for a channel signal transmitted from the transmission line 3 between the optical multiplexing transmitters D and B.

An optical multiplexing transmitter according to the present invention will be now explained, which can realize a maintenance and operation service according to a priority for protecting a failed channel which is determined according to the degree of influence on services to end users.

Figure 3:
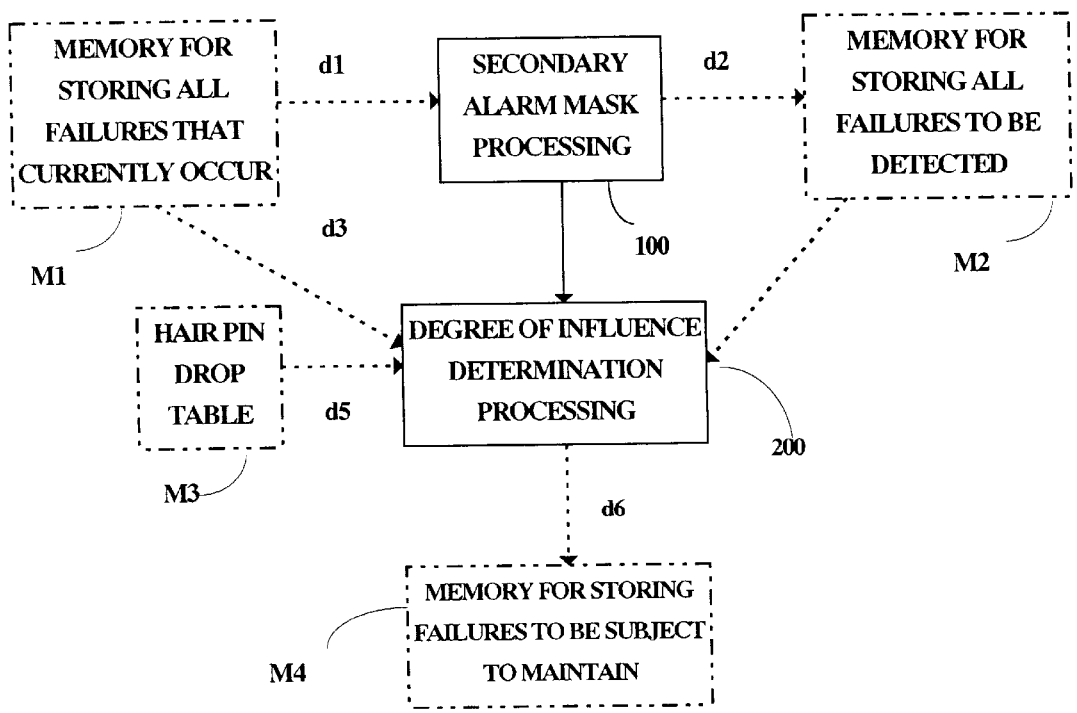
FIG. 3 is an explanatory diagram of an influencing ratio distinction processing and a secondary alarm mask processing performed in each optical multiplexing transmitter.

FIG. 3 is a diagram explaining a processing for determining degree of influence and secondary alarm masking performed in the optical multiplexing transmitters. In the operation shown in FIG. 3, broken arrows d1 to d6 show data transition and a solid arrow shows a processing transition.

In FIG. 3, memories M1 to M4 are provided in the optical multiplexing transmitters, not shown in the diagram. The memory M3 stores hair pin drop tables 52 ③ and ⑤ as explained in FIG. 2.

The optical multiplexing transmitter further includes a controller, such as a computer, not shown in the diagram. The later-described processing can be realized by a control program executed by the controller.

In FIG. 3, a secondary alarm mask processing 100 is performed based on data d1 of all failures that currently occur and are stored in the memory M1. The result of the secondary alarm mask processing 100 is sent to the memory M2 which stores all failures to be detected.

In here, all failures that currently occur and are stored in the memory M1 are defined as information of all failures detected in each section of the optical multiplexing transmitter. However, there is also included information of failures that are not subject to maintain in the information of the detected failures. That is, failures that are likely to occur secondarily are not subject to be maintained. On the other hand, failures subject to be maintained are stored in the memory M2.

Figure 4:
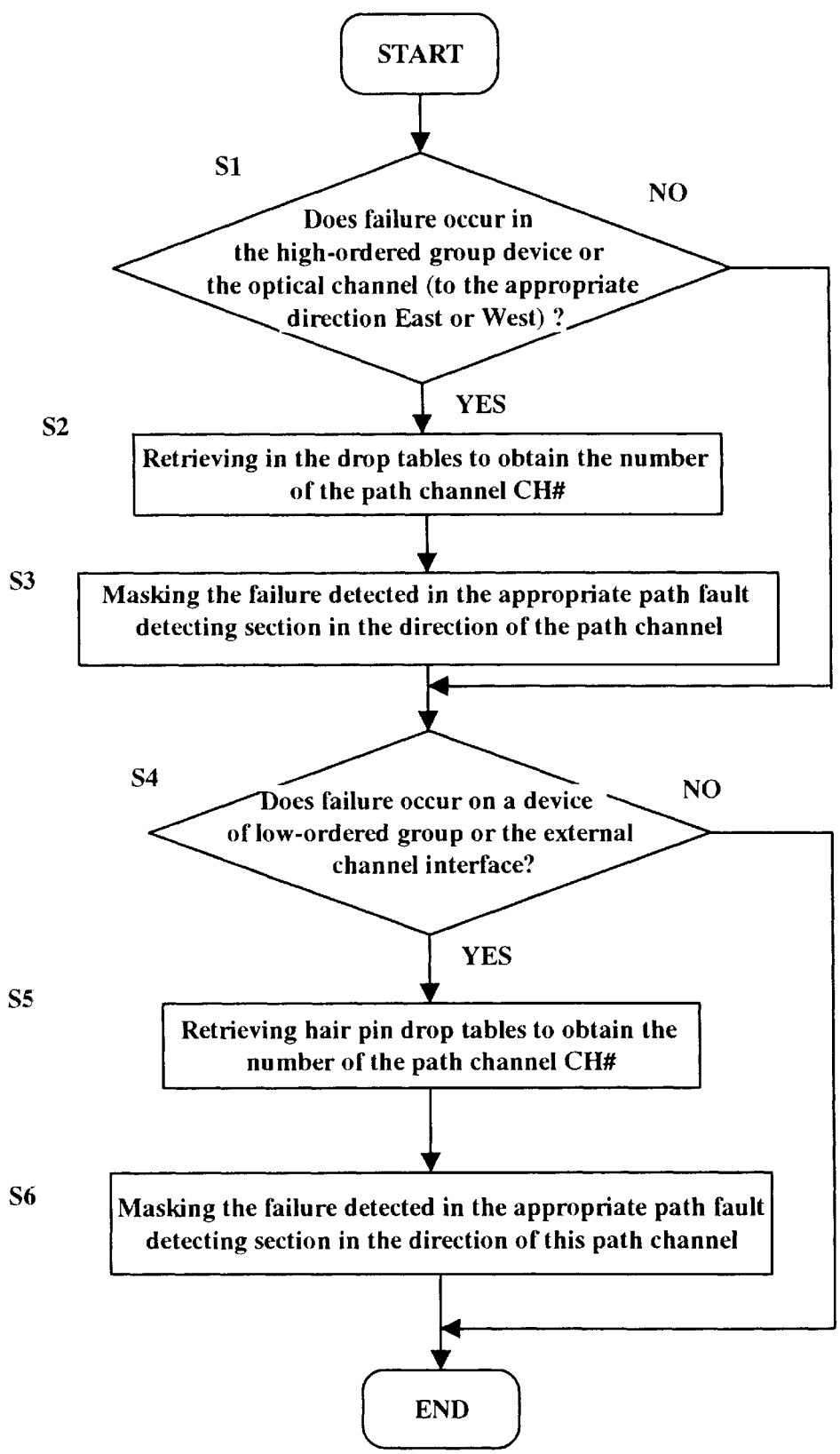
FIG. 4 illustrates an operational flowing chart of an embodiment of the secondary alarm mask processing 100.

FIG. 4 shows an operational flowing chart of an embodiment of the secondary alarm mask processing 100. The operation in the second alarm mask processing 100 is always executed when a failure occurs and are recovered. When a failure occurs on the low-ordered group device or the optical channel interface and a failure occurs on the high-ordered group device and an optical transmission line, there is a possibility to occur secondary failure on the termination of the path channel in the appropriate direction.

If the detected failure that occurs secondarily on the termination of the path channel is maintained, the cause of the failure is not fundamentally removed. This is because failures of the low-ordered device or the external transmission line interface and the high-ordered device or the optical transmission line that provoke the secondary failures should require maintenance.

Accordingly, the failures that occur secondarily are masked on the secondary alarm mask processing 100.

As described above, there is possibility to provoke the failure of the hair-pin cross connected termination path channel, caused by the failures of the low-ordered group device or the external transmission line interface and the high-ordered group device or the optical transmission line. Then, it is judged whether or not a failure occurs in the high-ordered group device or the optical channel (STEP S1). When a failure is detected, the drop tables 52 ② and ⑤ explained in FIG. 2 are retrieved to obtain the number CH# of the termination path channel over which influence of the failure ranges (STEP S2). Then, the failure detected in the appropriate path fault detecting section in the direction of this path channel is masked (STEP S3).

Similarly, it is judged whether or not a failure occurs on the low-ordered group device or the external transmission line interface (STEP S4). When a failure is detected, the hair pin drop tables 52 ③ and ⑥ explained in FIG. 2 are retrieved to obtain the number CH# of the termination path channel over which influence of the failure ranges (STEP S5). Then, the failure detected in the appropriate path fault detecting section in the direction of this path channel is masked (STEP S6).

In this way, the termination path channel CH# is masked to store in the memory M2 as a failure to be detected.

After the secondary failure mask processing 100 is finished, determination processing 200 is performed to determine the degree of influence. The detailed explanation of the processing 200 is shown in FIGS. 5 and 6.

The degree of influence is determined, i.e., it is determined whether the failure is SA (Service Affect) or NSA (Non Service Affect), in the determination processing 200. Therefore, the determination of influence degree is executed according to an optional path channel failure and a nodal failure giving the influence on the path channel in the optional multiplexing transmitter in FIGS. 5 and 6.

Contents of the memories M1, M2, and M3 are utilized to execute the processing 200. When a path channel failure on the East side is determined, the determination processing of influence degree is performed by retrieving a nodal failure on the West side or a low-ordered group nodal failure turned by a hair pin dropping, and mismounted units at first.

Figure 5:
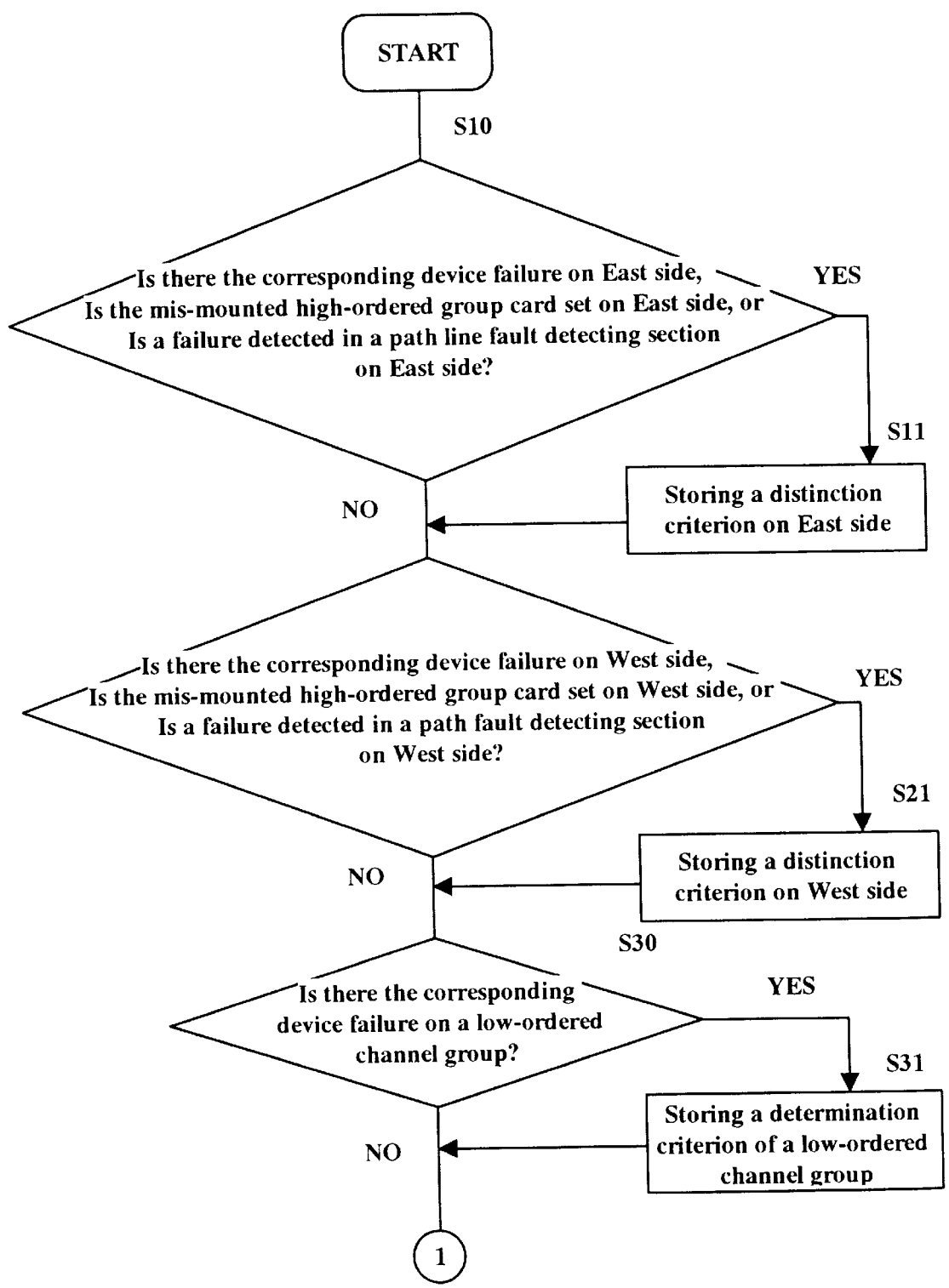
FIG. 5 shows a first detailed operational flowing chart of an influencing ratio distinction processing 200.
Figure 6:
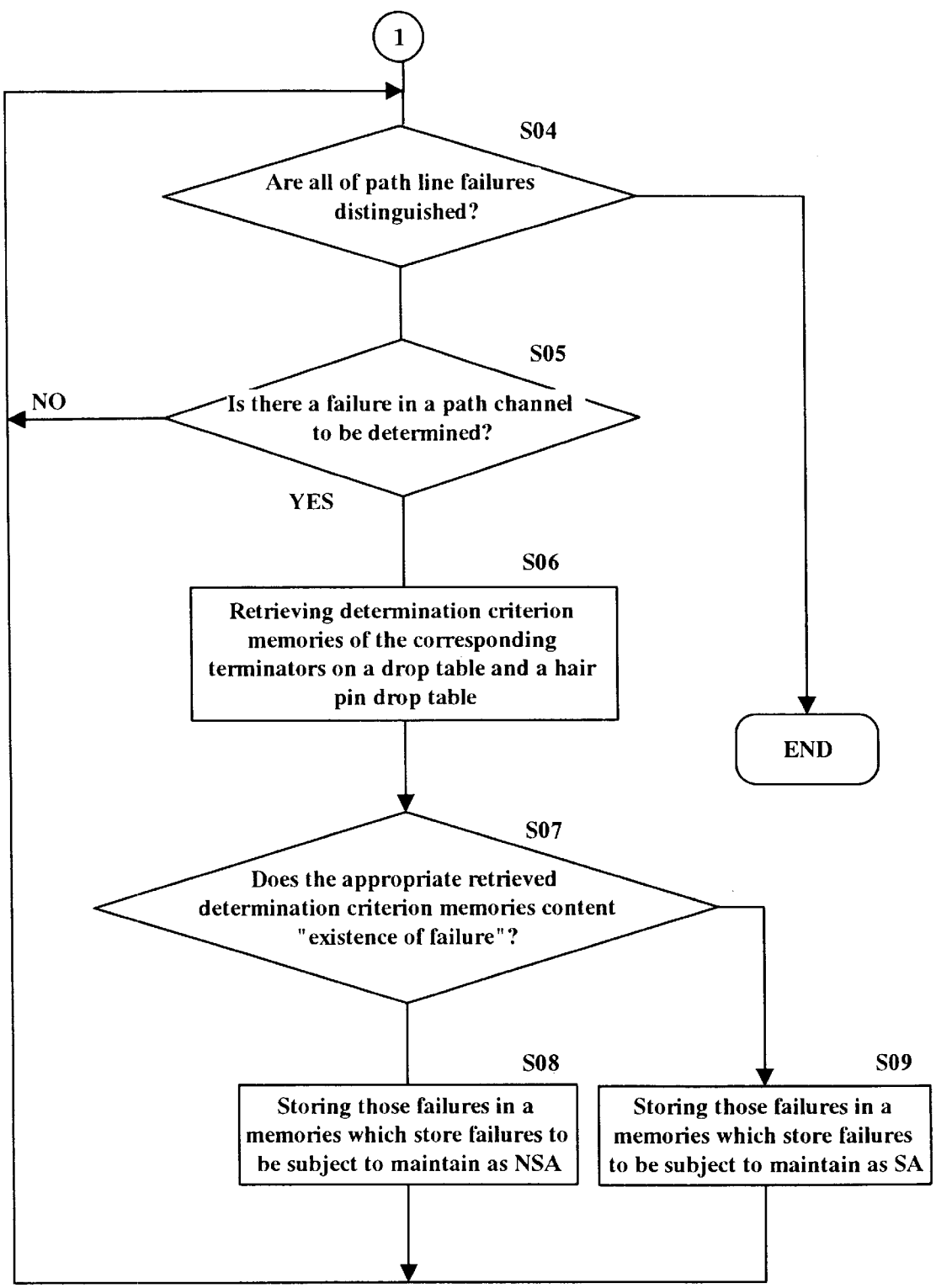
FIG. 6 shows a second detailed operational flowing chart of an influencing ratio distinction processing 200.

As shown in FIG. 5, it is judged whether or not there is the corresponding nodal failure on the East side, the mismounted card of the high-ordered group is set on the East side, or a failure is detected in the path fault detecting section on the East side (STEP S1). If a failure is detected in the above-described step 10, "existence of a failure" is stored in the memory as a determination criterion on the East side (STEP S11).

Similarly, it is judged whether or not there is the corresponding nodal failure on the West side, mismounted card of the high-ordered group is set on the West side, or a failure is detected in the path fault detecting section on the West side (STEP S20). If a failure is detected in the above-described step 20, "existence of a failure" is stored in the memory as a determination criterion on the West side (STEP S21).

Then, when there is the corresponding nodal failure on the low-ordered channel group (STEP S30), "existence of a failure" is stored in the memory as a determination criterion of the low-ordered group (STEP S31).

Next, it is judged whether or not there is a failure in the path channel to be determined (STEP S05). When a channel failure is detected, the determination criterion memories of the corresponding terminators 601 to 603 (refer to FIG. 1) are retrieved on the drop table 51 and the hair pin drop table 52 (STEP S06).

When a failure occurs on the path channel of the East side, the corresponding determination criterion memory on the West side is retrieved. On the contrary, when a failure occurs on the path channel of the West side, the corresponding determination criterion memory on the East side is retrieved.

When the content of the appropriate retrieved determination criterion memory is "existence of a failure", as mentioned above (STEP S07), the failure occurs on both of the West and East sides. That causes serious failures. Therefore, those failures are stored in memories which store failures to be subject to maintain as SA (STEP S08). If the memory does not contain "existence of a failure", the failure is stored in memories which store failures to be subject to maintain as NSA (STEP S09).

Figure 7:
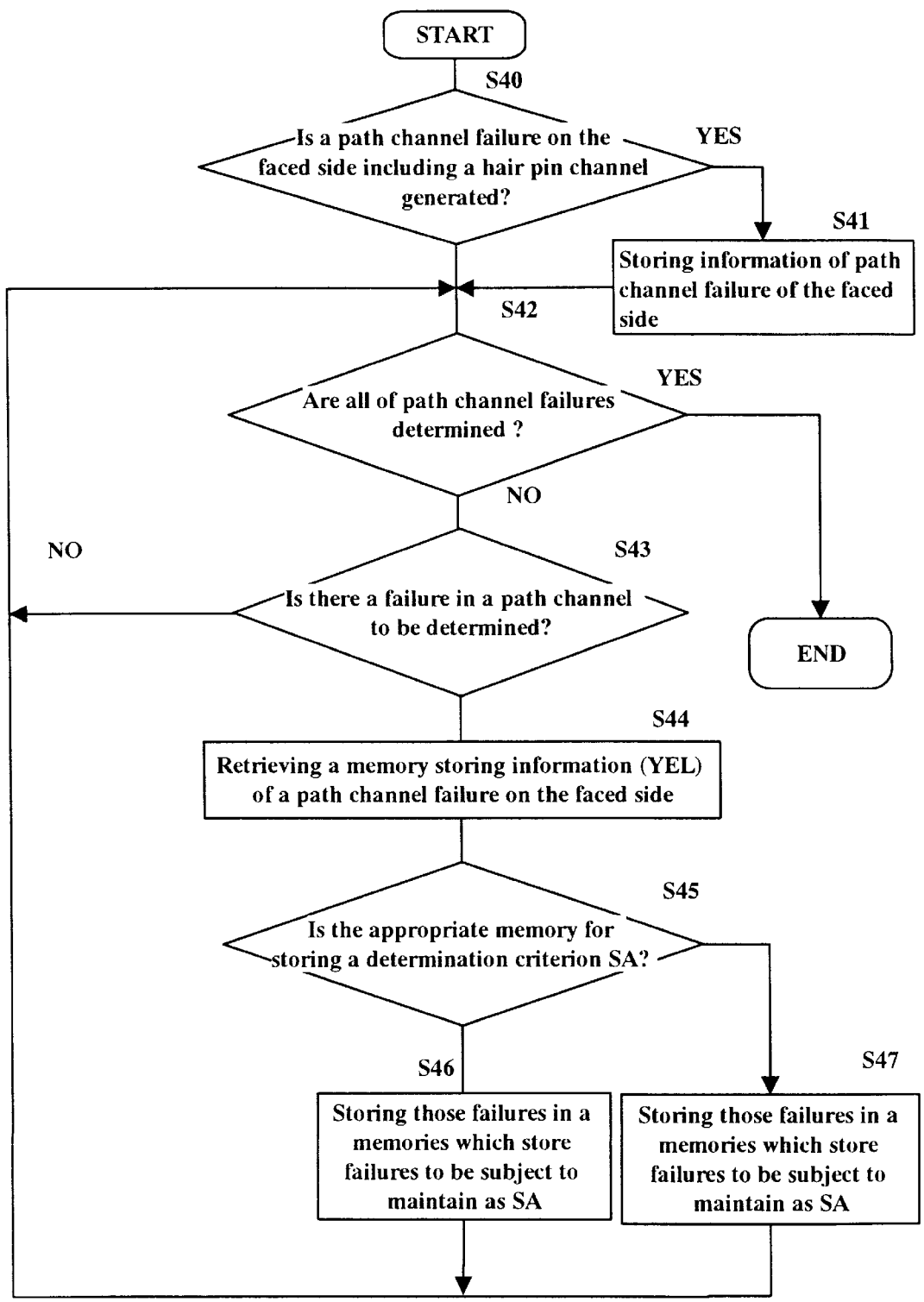
FIG. 7 shows a detailed operational flowing chart of an influencing ratio distinction processing 200 when an information of faults in the faced station including an optical path channel.

In regard to FIG. 7, a detailed operational flowing chart of the determination processing 200 of influence degree is shown. The case shown in FIG. 7 differs from those shown in FIGS. 5 and 6 described above. When information of failures in the faced side including a path channel cross-connected as a hair pin (YEL alarm: failures on a path channel of the transmitter) is generated on determining an optional path channel failure of the receiver, an influencing degree is determined by determining the failure as SA, even if there is a path channel failure on the receiver.

When the failure is informed from the faced side, and a failure occurs on one of the path channels of the receiver on the optical multiplexing transmitter, communications cannot be facilitated. Therefore, the path channel cannot be protected, that is, a service to the users can not be performed, and the failure is determined as SA.

Figure 8:
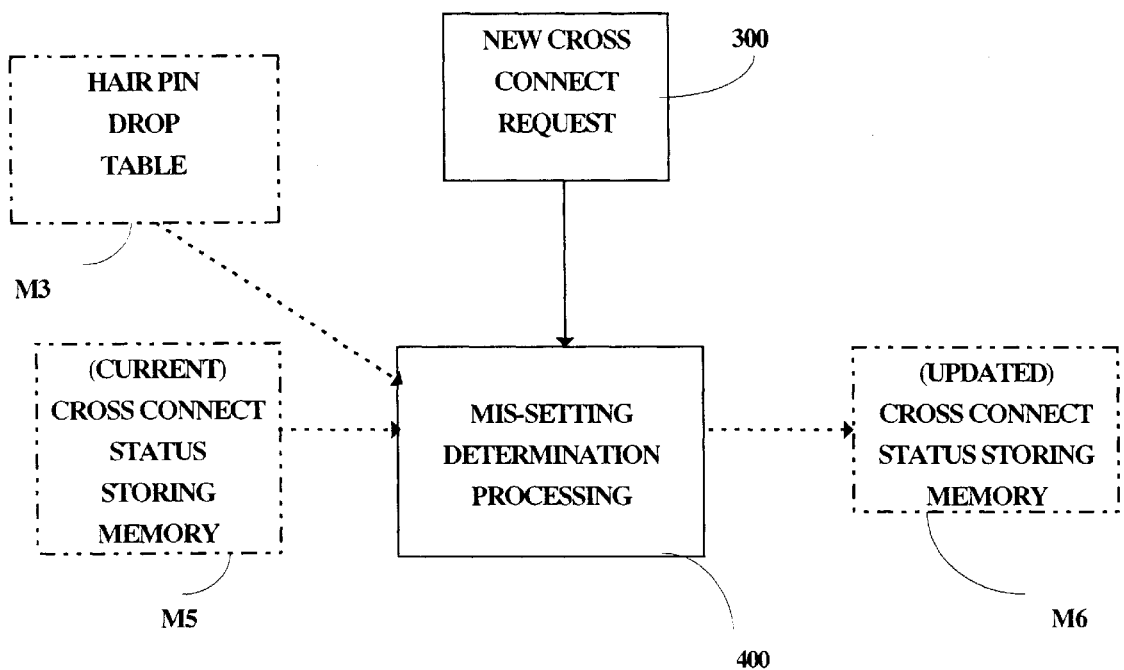
FIG. 8 is an explanatory diagram of a missetting distinction processing 400 for denying a connecting request in response to a new cross connect request 300.

FIG. 8 shows an explanatory diagram of a missetting determination processing 400 for determining missetting per a connection request and denying the appropriate connection request to a new cross connect request 300. The processing is performed according to the contents of the hair-pin drop table M3 and the current contents of the memory M5 on the cross-connected status in order to update the M6 on the cross-connected status on the missetting determination processing 400.

Figure 9:
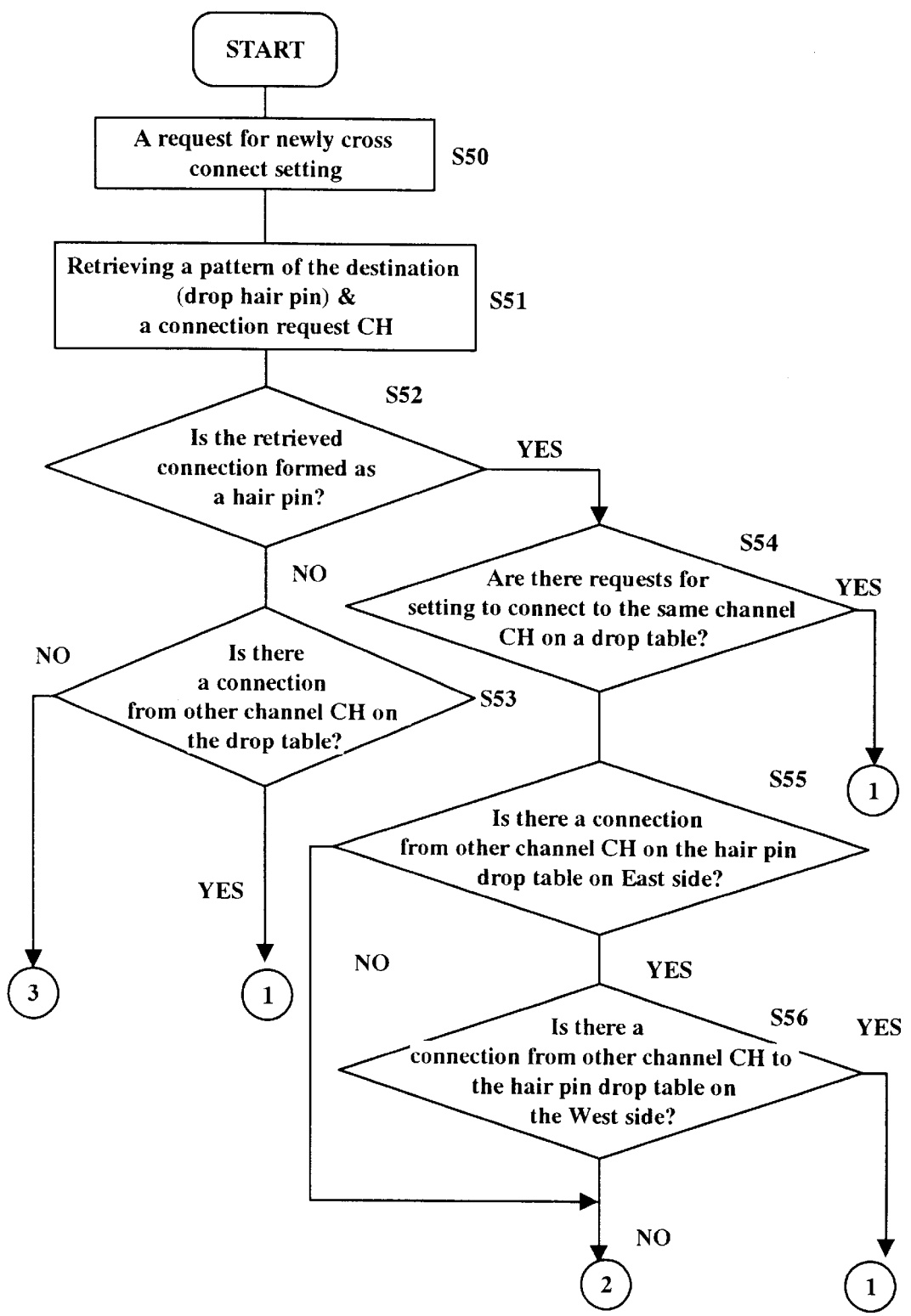
FIG. 9 shows a first detailed operational flowing chart of a missetting distinction processing 400.
Figure 10:
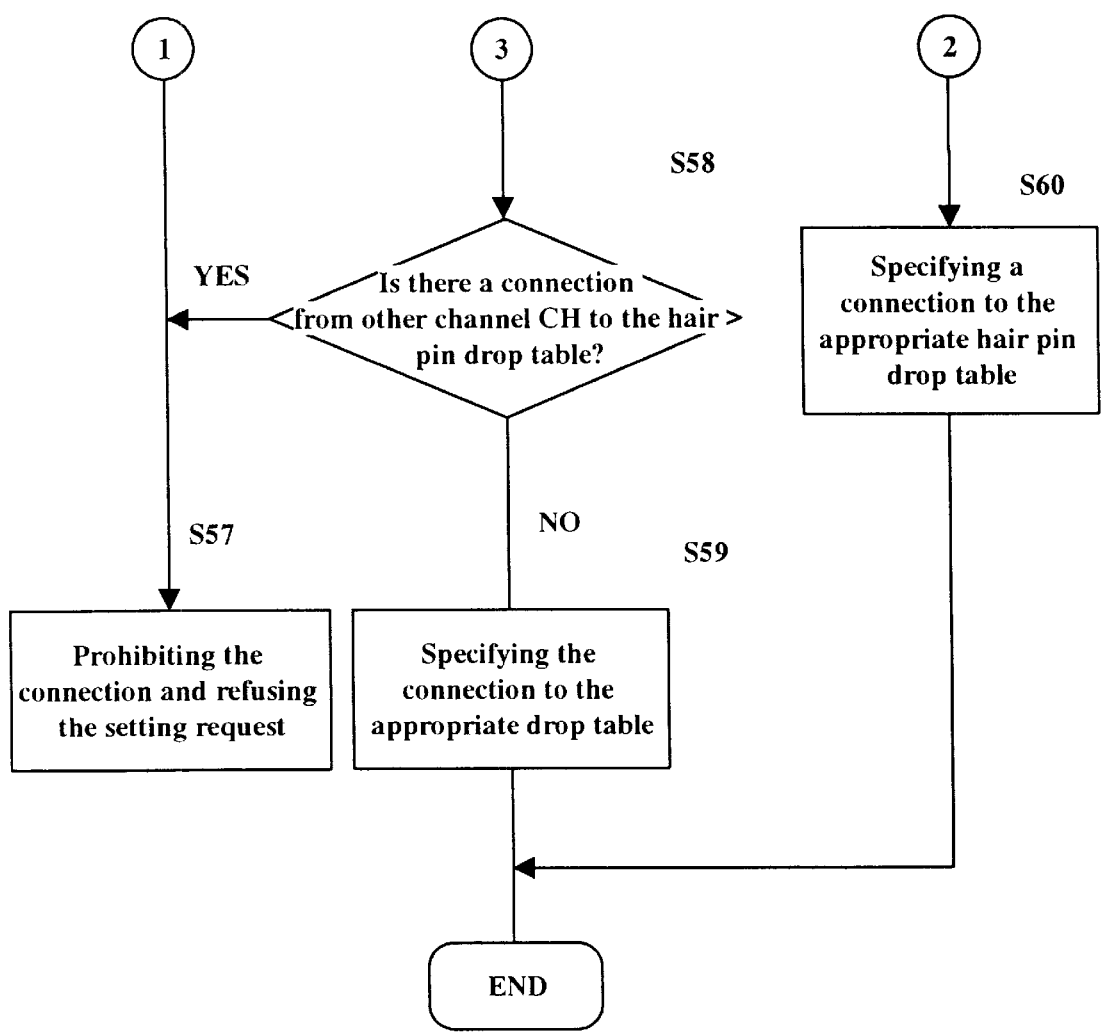
FIG. 10 shows a second detailed operational flowing chart of a missetting distinction processing 400.

The detailed explanation can be shown according to the operational flowing charts shown in FIGS. 9 and 10. In FIG. 9, a request for newly cross connect setting (STEP S50) is required. Then, it is determined from and to which users the connection is sent (STEP S51).

Next, it is judged whether or not the determined connection is formed as a hair pin, i.e., a request for turning and connecting from the low-ordered group to the low-ordered group (STEP S52). Since the connection is formed as a hair pin, it is judged whether or not there are requests for setting to connect to the same channel CH on the high-ordered drop table 52 (STEP S54). When there are requests for setting to connect to the same channel CH, the connection is prohibited and the setting request is refused (STEP S57: refer to FIG. 10).

On the step S52, the determined connection is not formed as a hair pin, i.e., a request for turning and connecting from the low-ordered group to the low-ordered group, but it is judged whether or not there is a connection from other channel CH on the drop table (STEP S53). When there is the connection from the other channel CH, the connection is prohibited similarly and the connection request is refused (STEP S57).

If there is no connection, it is judged whether or not there is a connection from other channel CH to the hair pin drop table 52 (STEP S58), the requested connection is prohibited here (SETP S57). If there is no connection, the connection is specified to the appropriate drop table according to the request (STEP S59).

Returning to the step S54, when the connection request is formed as a hair-pin, i.e., the connection for turning from the low-ordered group to the low-ordered group, and there is no connection of the same channel CH in the drop table, it is judged whether or not there is a connection from other channel CH in the hair-pin drop table on the East side (STEP S55). If there is a connection, it is judged whether or not the connection from other channel CH to the hair pin drop table on the West side (STEP S56). Accordingly, when there is a connection from other channel CH to both of the East and West sides, the connection is prohibited and the connection request is refused (STEP S57).

If there is no connection from other channel CH to either the East side or the West side, a connection to the appropriate hair pin drop table is specified (STEP S60).

It becomes possible to provide an economical maintenance and an operation service including a maintenance and monitoring function in which influencing degree of the failed channel to the users is determined in correspondence to the connection forms as mentioned above.

As explained above in the present embodiments, according to the present invention, it becomes possible to increase a protection power for the failed channels and further operate the optical multiplexing transmitter with a cheap cost for maintenance by processing the time slot CH dropped like a hair pin in each functional block.

The present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical multiplexing transmitter located on a first ring transmission line of a high-ordered channel group, comprising:

a multiplexing and demultiplexing section operatively connected to a transmission line of the high- ordered channel group for multiplexing optional time slots of a low-ordered channel group and demultiplexing optional time slots of the high-ordered channel group;

a terminator operatively connected to an external transmitter of the low-ordered channel group, which is connected via a transmission line to an opposing transmitter located on a second ring transmission line of a high-ordered channel group; and a cross connect section for connecting optional time slots demultiplexed by the multiplexing and demultiplexing section, of the high-ordered channel group to optional time slots of the low-ordered channel via the terminator, and optional time slots of the low-ordered channel group to the multiplexing and demultiplexing section to multiplex to the high-ordered group channel, and setting to turn and connect an optional time slot of said low-ordered channel group back to an optional channel of the low-ordered channel group via the terminator in the form of a hair pin cross connection.

2. The optical multiplexing transmitter according to claim 1, wherein said cross connect section includes an add table for indicating a channel of the high-ordered channel group, to which time slots of said low-ordered channel group are multiplexed;

a drop table for indicating a channel of the low-ordered channel group, to which time slots demultiplexed from the high-ordered channel group is connected; and a hair pin drop table for indicating a channel of the low-ordered channel group, to which time slots of said low-ordered channel group are turned and connected.

3. The optical multiplexing transmitter according to claim 2, wherein a transmission line of said high-ordered channel group is formed as a ring, said cross connect section is operatively connected from East and West sides to said transmission line, and said add drop table, said drop table and said hair pin drop table are provided in correspondence to said East and West sides.

4. The optical multiplexing transmitter according to claim 3, wherein said cross connect section includes path switch sections for selecting time slots from the East side or the West side from said high-ordered channel group and connecting to the corresponding channel of the low-ordered channel group.

5. The optical multiplexing transmitter according to claim 3, wherein said cross sections for selecting time slots of said high-ordered channel group, or time slots of said low-ordered channel group and connecting to the corresponding channel of the lower ordered channel group.

6. The optical multiplexing transmitter according to claim 1, wherein the transmission line of the high-ordered channel group is an optical fiber and there is further comprised of an optical to electrical converter located between said multiplexing and demultiplexing section and the optical fiber.

7. The multiplexing transmitter, according to claim 1, wherein said cross connection section detects a failure of an optional high-ordered channel group and a nodal failure influencing on the high-ordered channel group.

8. The multiplexing transmitter according to claim 7, wherein said cross connect section determines whether the detected failure does influence on services to end users or not.

9. The optical multiplexing transmitter according to claim 7, wherein said cross connect section determines whether a failure of a high-ordered channel group on East or West side gives damage to a service to end users or not, according to an existence of a nodal failure influencing on channels of the high-ordered channel group on the corresponding West or East side.

10. The optical multiplexing transmitter according to claim 7, wherein said cross connect section determines failure that occurs on an opposing side including a hair pin connection channel, connected as a hair pin as failure giving damage to a service to the end users, even if only one of high-ordered channel groups of East or West side on a receiver is failed.

11. The optical multiplexing transmitter according to claim 7, wherein said cross connect section masks a secondary channel failure that occurs due to a failure of said high-ordered channel group, so that the failure of said high-ordered channel group is not employed to determine whether or not the failure of said high-ordered channel group influences on a service to end users.

12. The optical multiplexing transmitter according to claims 7, wherein said cross connect section refuses a new cross connect request when a plurality of connections including a hair pin cross connection are overlapped to connect to the same time slot.

* * * * *